US011572934B2

(12) United States Patent
Scott

(10) Patent No.: US 11,572,934 B2
(45) Date of Patent: Feb. 7, 2023

(54) TENSIONING OF BELT DRIVES

(71) Applicant: Perkins Engines Company Limited, Peterborough (GB)

(72) Inventor: Jonathan Scott, Bourne (GB)

(73) Assignee: Perkins Engines Company Limited, Peterborough (GB)

( * ) Notice: Subject to any disclaimer, the term of this patent is extended or adjusted under 35 U.S.C. 154(b) by 190 days.

(21) Appl. No.: 16/933,156

(22) Filed: Jul. 20, 2020

(65) Prior Publication Data

US 2021/0033173 A1 Feb. 4, 2021

(30) Foreign Application Priority Data

Aug. 2, 2019 (GB) ...................... 1911089

(51) Int. Cl.
*F16H 7/08* (2006.01)
*F16H 7/02* (2006.01)
*F02B 67/06* (2006.01)
*F16H 7/14* (2006.01)

(52) U.S. Cl.
CPC ............... *F16H 7/08* (2013.01); *F02B 67/06* (2013.01); *F16H 7/02* (2013.01); *F16H 7/14* (2013.01); *F16H 2007/088* (2013.01); *F16H 2007/0842* (2013.01); *F16H 2007/0865* (2013.01);
(Continued)

(58) Field of Classification Search
CPC ..... F16H 7/00; F16H 7/02; F16H 7/08; F16H 2007/0842; F16H 2007/0846; F16H 2007/0844; F16H 2007/0863; F16H 2007/0865; F16H 2007/0876; F16H 2007/088; F16H 2007/0821; F16H 2007/0893; F16H 7/10; F16H 7/12; F16H 7/14; F16H 7/16; F16H 7/1254;
(Continued)

(56) References Cited

U.S. PATENT DOCUMENTS 3,274,841 A * 9/1966 Roberts .................. F02B 67/06
248/666
3,306,121 A * 2/1967 Jenkins .................... F01P 5/04
474/117
(Continued)

FOREIGN PATENT DOCUMENTS

CN 103335077 A 10/2013
DE 102004006577 A1 9/2005
(Continued)

OTHER PUBLICATIONS

Great Britain Search Report for related GB Application No. GB1911089.9; dated Nov. 12, 2019.

*Primary Examiner* — Michael R Mansen
*Assistant Examiner* — Raveen J Dias

(57) ABSTRACT

A belt drive comprises a first pulley and at least one additional pulley and uses an elastic belt that is engagable over the pulleys. An auxiliary unit, connected to the first pulley, has a detent. A tensioning link comprises an open-ended slot for receiving in a slidable manner the detent. In an operating position of the belt drive the detent is locatable at a closed end of the open-ended slot and to obtain a belt changing position the detent is movable along the open-ended slot towards an open end of the open-ended slot. Movement of the detent along the open-ended slot requires simultaneous rotation of the auxiliary unit.

15 Claims, 4 Drawing Sheets

(52) U.S. Cl.
CPC ............... *F16H 2007/0876* (2013.01); *F16H 2007/0893* (2013.01)

(58) Field of Classification Search
CPC ...... F16H 7/1281; F16H 7/0848; F02B 67/00; F02B 67/06
USPC .......................................................... 474/101
See application file for complete search history.

(56) References Cited

U.S. PATENT DOCUMENTS

| | | | | |
|---|---|---|---|---|
| 3,430,507 A * | 3/1969 | Oswald | ................... | F16H 7/14 474/113 |
| 3,631,734 A * | 1/1972 | Wagner | ................... | F16H 7/14 474/117 |
| 3,811,333 A * | 5/1974 | Castarede | ............. | F16H 7/1281 474/135 |
| 3,922,927 A * | 12/1975 | Shiki | .................... | F02B 67/06 474/113 |
| 4,244,559 A * | 1/1981 | Mote | .................... | F16H 7/14 254/129 |
| 4,452,418 A * | 6/1984 | Urushihara | ........ | B60H 1/00521 248/666 |
| 4,512,752 A * | 4/1985 | Brenneman | ............... | F16H 7/14 474/133 |
| 4,571,221 A * | 2/1986 | Isobe | .................... | F16H 7/14 474/101 |
| 4,583,961 A * | 4/1986 | Kawasawa | ................ | F16H 7/14 474/133 |
| 4,618,336 A * | 10/1986 | Isobe | .................... | F16H 7/14 474/133 |
| 4,708,320 A * | 11/1987 | Hodges | ................... | B25B 25/00 254/129 |
| 4,887,992 A | 12/1989 | Dixon | | |
| 5,938,169 A * | 8/1999 | Ogawa | ................... | F02B 67/06 123/195 A |
| 5,989,084 A * | 11/1999 | Tsunoda | ................ | F02B 61/045 123/195 A |
| 7,448,973 B2 * | 11/2008 | Simmons | .................. | F16H 7/14 474/101 |
| 2003/0176250 A1 * | 9/2003 | Austin | .................... | F02B 67/06 474/134 |
| 2004/0077445 A1 * | 4/2004 | Prior | ..................... | F16C 13/006 474/123 |
| 2009/0111630 A1 | 4/2009 | Kume | | |
| 2014/0238320 A1 * | 8/2014 | Stade | ........................ | F16H 7/14 123/52.1 |
| 2016/0091064 A1 * | 3/2016 | Aubertin | ............... | F16H 7/1281 474/133 |
| 2017/0037941 A1 * | 2/2017 | Trick | .................... | F16H 7/1281 |
| 2018/0080528 A1 | 3/2018 | Wagner | | |

FOREIGN PATENT DOCUMENTS

| | | | |
|---|---|---|---|
| DE | 102005054744 A1 | 5/2007 | |
| EP | 0050238 A1 * | 4/1982 | ............... F16H 7/14 |
| EP | 3133314 A1 | 2/2017 | |
| FR | 2558553 A1 * | 7/1985 | ............... F16H 7/14 |
| FR | 2641051 A1 * | 6/1990 | ............... F16H 7/14 |
| FR | 2685422 A1 * | 6/1993 | ............... F16H 7/14 |
| GB | 2579586 A * | 7/2020 | ............... F16H 7/08 |

* cited by examiner

TENSIONING OF BELT DRIVES

CROSS-REFERENCE TO RELATED APPLICATION

This application claims priority under 35 USC § 119 and the Paris Convention to Great Britain Patent Application No. 1911089.9 filed on Aug. 2, 2019.

TECHNICAL FIELD

The disclosure relates to the tensioning of belt drives. For example, the tensioning of belt drives coupled to an internal combustion engine.

BACKGROUND

A belt drive may be used to transfer rotary motion from a first element to a second element. For example, a belt drive may transfer rotary motion of a first pulley to a second pulley. The first pulley may be driven to rotate by an external driver, for example an internal combustion engine. The second pulley may be driven to rotate by frictional engagement of a belt that extends around the first pulley and the second pulley.

In some examples of belt drive a third pulley is provided and the belt extends around the first pulley, the second pulley and the third pulley. The belt may be a Multi-V-belt which takes is name from the shape adopted by the belt at each pulley.

For the belt drive to function correctly the belt must be tensioned correctly around the pulleys. If the belt is too loose then slippage will occur between the belt and the pulleys. If the belt is too tight then the useful life of the belt and or the bearings of the belt drive may be reduced.

Obtaining the correct tension of the belt may be achieved by choosing a specific length for the belt that matches a known geometry of the pulleys and their relative spacing. However, mounting of the belt may require the use of specialised assembly tooling or the use of multi-part pulleys that can be partially dissembled to allow the belt to be passed over the rims of the pulleys. Where the belt is an elastic belt it may be possible to stretch the belt sufficiently for it to pass over the rims of the pulleys. However, stretching of an elastic belt in this way may overstretch and damage the belt. It may also be difficult to reliably obtain the correct tension in the belt once it has been stretched over the rims of the pulleys.

DE 10 2004 006 577 A1 discloses a belt drive for an alternator of an internal combustion engine of a motor vehicle. An elastic belt connects the internal combustion engine and the alternator drivingly to one another. At least one component of the alternator to which the elastic belt is applied is mounted with a changeable position. The component of changeable position permits the belt to be laid loosely over all the components of the belt drive to which it is applied and subsequently, by means of a change of position of the aforementioned component, to bring about a tensioning of the elastic belt in an operationally ready state. The alternator is rotatably mounted and provided with a stud bolt that passes through a parabolic slot in a slotted link member. The elastic belt is tensioned by rotating the alternator to move the stud bolt along the parabolic slot. A nut associated with the stud bolt is then tightened to lastingly ensure the operating position of the alternator.

While the arrangement of DE 10 2004 006 577 A1 may permit tensioning of an elastic belt without the need for specialised assembly tooling or use of multi-part pulleys it still has disadvantages, First, the arrangement requires the use of a nut associated with the stud bolt to lastingly ensure the operating position of the alternator. Secondly, the arrangement does not ensure that a pre-defined tension in the elastic belt is obtained since the stud bolt can be fixedly located at a plurality of locations along the parabolic slot.

US2016/091064 discloses an assembly comprising: a fixed support such as an engine block, a plurality of pulleys mounted rotatably on the support a belt mounted on said pulleys a tensioner comprising: a plate a rotary element mounted on the plate via a rotating shaft fixed relative to said plate, the tensioner being capable of turning relative to the support, in a predefined direction of rotation, between an idle position in which the rotary element is separated from the belt and an operating position in which the rotary element is in contact with the belt, it being specified that, in the operating position, the belt exerts a force on the rotary element, the direction of said force tending to rotate the tensioner in said same predefined direction of rotation; at least one stop for preventing the tensioner from rotating in the predefined direction of rotation beyond the operating position of same, the latter thus being defined by the stop; wherein in order to rotate the tensioner relative to the support between the idle position and the operating position of the tensioner, the assembly comprises: at least one closed port arranged on the plate of the tensioner or on the support at least one means for engaging with the or each closed port, said engaging means being fixed relative to the support when the closed port is located on the plate or fixed relative to the plate when the closed port is located on the support.

While the arrangement of US2016/091064 may permit the tensioning of a belt, it requires a relatively complicated tensioner comprising at least a plate, a rotary element and a rotating shaft. This is in part due to the arrangement being configured for use with an assembly where the plurality of pulleys are at fixed locations on the support. Consequently, the rotary element is configured in the operating position to contact the belt and rotate with the belt. In addition, the arrangement requires use of a specialised assembly tool for engaging with an orifice in the plate to facilitate the assembly of the tensioner. Further, the requirement for use of the closed port and its respective means for engaging may result in a relatively complicated assembly procedure of the tensioner to the engine block.

SUMMARY OF THE DISCLOSURE

The present disclosure provides a belt drive comprising:
a first pulley;
at least one additional pulley;
an elastic belt that is engagable over the first pulley and the at least one additional pulley; and
an auxiliary unit connected to the first pulley;
the auxiliary unit comprising a detent;
the auxiliary unit being rotatable about a first pivot between an operating position and a belt changing position, wherein in the belt changing position the first pulley is closer to the at least one additional pulley than in the operating position such that a tension of the elastic belt is less in the belt changing position than in the operating position;
the belt drive further comprising a tensioning link being rotatable about a second pivot;
the tensioning link comprising an open-ended slot for receiving in a slidable manner the detent; the open-ended slot having an open end and a closed end and being configured such that the closed end is located closer to the second pivot than the open end;

in the operating position the detent is locatable at the closed end of the open-ended slot and to obtain the belt changing position the detent is movable along the open-ended slot towards, and preferably out of, the open end of the open-ended slot; wherein movement of the detent along the open-ended slot requires simultaneous rotation of the auxiliary unit about the first pivot.

The present disclosure further provides a tensioning link for a belt drive comprising:

an elongate body having an aperture for rotatably mounting the tensioning link to a pivot and an open-ended slot for receiving in a slidable manner a detent;

the open-ended slot having an open end and a closed end; the closed end being located closer to the aperture than the open end.

BRIEF DESCRIPTION OF THE DRAWINGS

Specific embodiments of the disclosure will now be described, by way of example only, with reference to the accompanying drawings in which.

DETAILED DESCRIPTION

Figure 1:
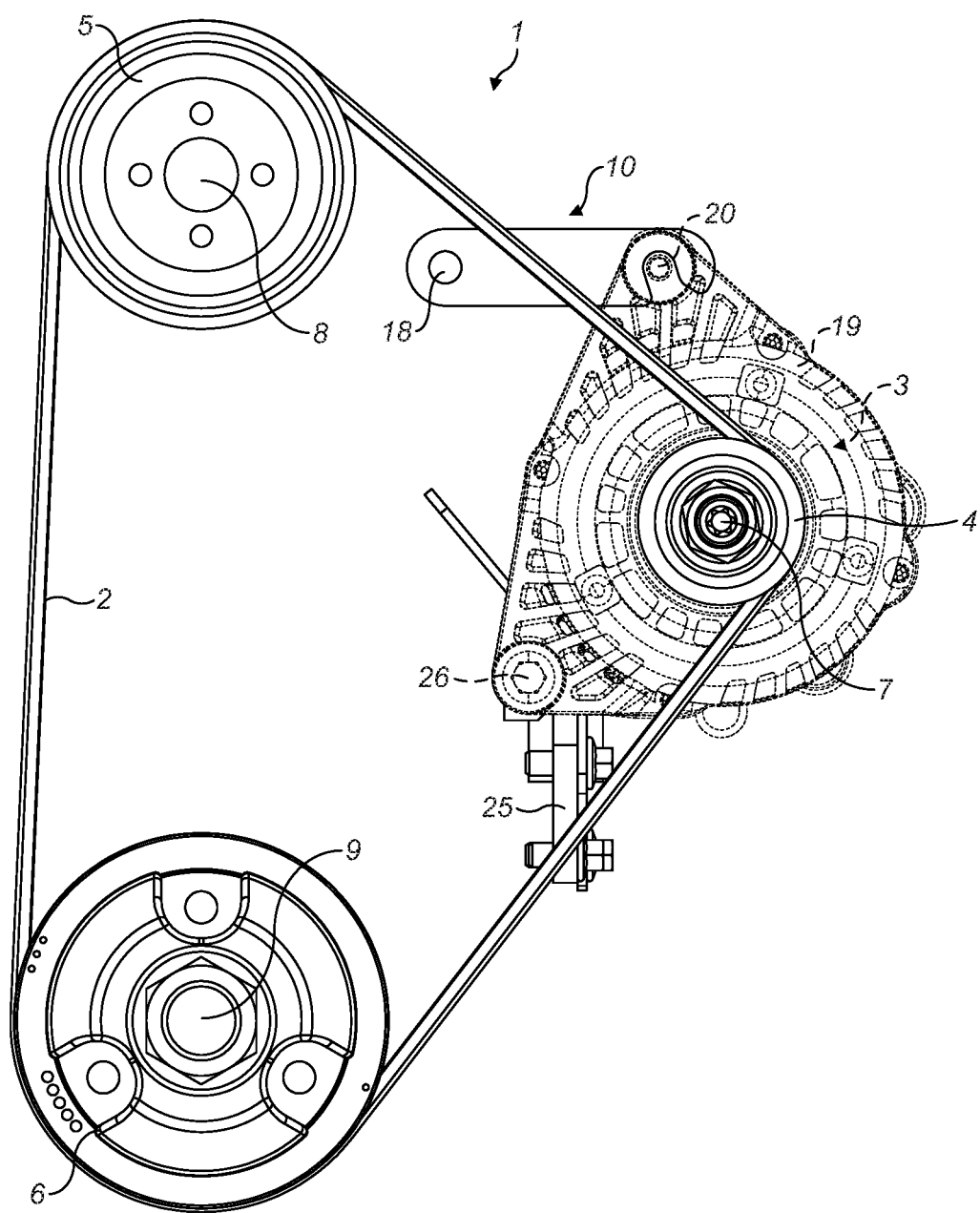
FIG. 1 shows a belt drive according to the present disclosure in an operating position.

In the following description as such as 'upper' and 'lower' are used to describe relative positions of features. Such terms are to be understood, unless the immediate context requires otherwise, as referring to an absolute frame of reference in which the force of gravity acts in a 'down' direction towards 'ground level'. As such, the terms 'upper' and 'lower' refer to relative positions from the ground level.

In the following description a part may be described as comprising a 'pivot'. For example, a first part may be described as comprising a pivot for rotatably coupling the first part to a second part. Unless the immediate context requires otherwise, the term pivot encompasses any suitable construction allowing rotational coupling of the first part to the second part. As non-limiting examples, the pivot may comprise a pin, shaft or axle that rotates within an aperture, casing or bearing. The pivot or a part of the pivot may be integral with the first part or integral with the second part. The pivot may comprise one or more additional components that couple between the first part and the second part.

As illustrated in FIGS. 1 to 4 there is provided a belt drive 1 comprising a first pulley 4, at least one additional pulley 5, 6, an elastic belt 2 and an auxiliary unit 3 connected to the first pulley 4. The elastic belt is engagable over the first pulley 4 and the at least one additional pulley 5, 6.

The belt drive 1 may be coupled to an internal combustion engine (ICE). The ICE may be part of a vehicle. The at least one additional pulley 5, 6 may include a driven pulley that is driven to rotate by an output of the ICE. The first pulley 4 is preferably driven to rotate by frictional engagement of the first pulley 4 with the elastic belt 2 as the elastic belt 2 moves over the first pulley 4.

In some embodiments the at least one additional pulley includes at least a second pulley 5 and a third pulley 6. In some embodiments the elastic belt 2 is an elastic Multi-V-belt and the first pulley 4, second pulley 5 and the third pulley 6 are spaced in a triangular arrangement as shown in FIG. 1. The first pulley 4 may have an axis of rotation 7. The second pulley 5 may have an axis of rotation 8. The third pulley 6 may have an axis of rotation 9. The axes of rotation 7, 8, 9 may be parallel to one another.

In some embodiments the auxiliary unit 3 may be an alternator and rotation of the first pulley 4 may drive the alternator to generate electrical energy. The electrical energy may be supplied to a component of the ICE and or to a component of the vehicle.

The auxiliary unit 3 may comprise a housing 19, a first pivot 26 and a detent 20. The first pulley 4 may be coupled to the housing 19. The first pivot 26 may be provided at or near a lower extremity of the housing 19. The detent 20 may be provided at or near an upper extremity of the housing 19. In one example the detent 20 may be a stud bolt. The first pulley 4 may be coupled at or near a centre of the housing 19.

The first pivot 26 may rotatably mount the auxiliary unit 3 to an auxiliary unit mount 25 as shown in FIG. 1. The auxiliary unit mount 25 may form a part of the ICE or vehicle or may itself be mounted to the ICE or vehicle.

The auxiliary unit 3 is rotatable about the first pivot 26 between an operating position (shown in FIGS. 1 and 2) and a belt changing position as will be discussed further below.

Figure 4:
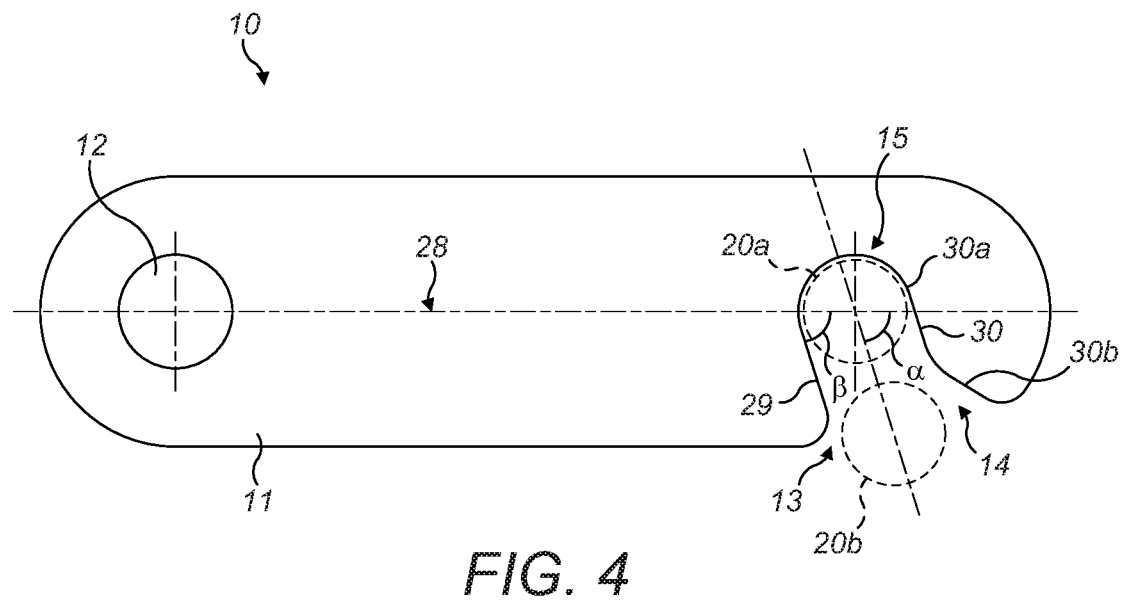
FIG. 4 shows a tensioning link of the belt drive of FIG. 1.

The belt drive further comprises a tensioning link 10, an example of which is shown in FIG. 4. The tensioning link 10 may comprise an elongate body 11. The tensioning link 10 comprises an open-ended slot 13 for receiving in a slidable manner a detent, for example the detent 20 of the auxiliary unit 3. In the present specification, an "open-ended slot" refers to a slot which extends fully to a peripheral edge of a body of the tensioning link 10 to form an opening or 'mouth' in the edge of the body and is in contrast to a 'closed' slot which would be fully surrounded by the body of the tensioning link 10.

The tensioning link 10 is rotatable about a second pivot 18. An aperture 12 may be provided in the elongate body 11 to permit mounting of the tensioning link 10 to form the second pivot 18. The second pivot 18 may rotatably mount the tensioning link 10 to a component (not shown for clarity) of the ICE or vehicle. The aperture 12 may be sized and shaped such that the tensioning link 10, in use, is constrained to have a fixed axis of rotation about the second pivot 18. For example, the second pivot 18 and the aperture 12 may both be circular with the internal diameter of the aperture 12 being only marginally greater than the external diameter of the second pivot such that relative rotation is enabled but without any significant lateral play in the tensioning link 10.

The elongate body 11 may be planar. The elongate body 11 may be formed from a sheet material, for example steel plate. The size of the elongate body 11 may be chosen dependent on the geometry of the belt drive. In some embodiments the elongate body 11 may have a length of between 70 mm and 110 mm, preferably between 70 mm and 90 mm, for example 75 mm. Additionally or alternatively, the elongate body 11 may have a width of between 15 and 35 mm, for example 20 mm. Additionally or alternatively, the width of the elongate body may be generally constant or constant along its length. The long edges of the elongate body 11 may be parallel to one another. The ends of the elongate body 11 may be rounded. The radius of curvature of the ends of the elongate body 11 may be between 7.5 mm and 17.5 mm, for example 10 mm. Additionally or alternatively, the elongate body 11 may have a thickness of between 5 and 10 mm, for example 6 mm.

At least a portion of the open-ended slot 13 may have an internal width sufficient to allow the detent 20 to pass there along. In some embodiments the width is between 8 and 10 mm.

The open-ended slot 13 comprises an open end 14 and a closed end 15. The closed end 15 is located closer to the aperture 12 than the open end 14.

The open-ended slot 13 is preferably orientated at an angle α of less than 90° to a radial line 28 which passes from the aperture 12 through the detent 20 when the detent 20 is located at the closed end 15 of the open-ended slot 13. More preferably angle α may be 65 to 80°. Yet more preferably angle α may be 70 to 76°. In one example angle α may be 73°. Angle α may be measured from the radial line 28 to a centreline of the open-ended slot 13.

The radial line 28 may extend parallel to the long edges of the elongate body 11 and may be centred there between.

Alternatively or additionally the open-ended slot 13 may comprise a first, preferably straight, edge 29 that extends between the open end 14 and the closed end 15, the first edge 29 being the edge of the open-ended slot 13 that is proximal to the aperture 12. The first edge 29 may be orientated at an angle β of less than 90° to the radial line 28. Preferably angle β may be 65 to 80°. More preferably angle β may be 70 to 76°. In one example angle β may be 73°.

Angle α may equal angle β or may be different to angle β.

The open-ended slot β may comprise a second edge 30 which may be distal the aperture 12. The second edge 30 may be straight. The first edge 29 and the second edge 30 may be parallel. The first edge 29 and the second edge 30 may be joined to one another by the closed end 15.

Alternatively or additionally the second edge 30 may have a straight portion 30a and a flared portion 30b. The flared portion 30b may be proximal the open end 14. The straight portion 30a may be proximal the closed end 15. The first edge 29 and the straight portion 30a of the second edge 30 may define a portion of the open-ended slot 13 of constant internal width. The portion of constant internal width may be proximal the closed end 15.

The flared portion 30b may provide a widening of the mouth of the open-ended slot 13 such that the first edge 29 and the flared portion 30b of the second edge 30 may define a portion of the open-ended slot 13 of varying internal width. The portion of varying internal width may be proximal the open end 14.

Alternatively or additionally the open-ended slot 13 may comprise at least a straight portion, preferably comprising straight parallel edges 29 and 30.

The closed end 15 may form an end stop of the open-ended slot 13 that is distal to the mouth of the open-ended slot 13. The end stop may be shaped to conform to the shape of the detent 20, for example by having matching or complementary radiuses of curvature.

In use, the tensioning link 10 is mounted rotatably about second pivot 18 using the aperture 12. The belt drive 1 may adopt its operating position as shown in FIG. 1. In the operating position the detent 20 may be located at the end stop formed by the closed end 15 of the open-ended slot 13. This position is shown in FIG. 4 as position 20a. A distance between the aperture 12 and the closed end 15 of the open-ended slot 13 may be configured to apply a predefined tension to the elastic belt 2 in the operating position. This distance is fixed by the fixed dimensions of the tensioning link 10 (and its open-ended slot 13). Further, since the position of the second pivot 18 is fixed relative to the operating locations of the axes of rotation 7, 8, 9 of the first pulley 4, the second pulley 5 and the third pulley 6, the predefined distance between the second pivot 18 and the closed end 15 of the open-ended slot 13 ensures that the tension of the elastic belt 2 may be predefined for when the auxiliary unit is in its operating position with the detent 20 at position 20a.

The open-ended slot 13 and in particular the first edge 29 may be angled such that, in the operating position, the tension in the elastic belt 2 urges the detent 20 against the closed end 15 into position 20a such that the detent 20 is retained in the open-ended slot 13 without requiring any additional securing means.

To obtain the belt changing position of the belt drive 1 the detent 20 may be moved towards, and preferably out of, the open end 14 of the open-ended slot 13 while simultaneously rotating the auxiliary unit 3 about the first pivot 26. To move the detent 20 from the closed end 15 to the open end 14 it is required to first rotate the auxiliary unit 3 in a first sense (clockwise as viewed in FIG. 1) that increases a tension in the elastic belt 2, The angling of the first edge 29 of the open-ended slot 13 may be chosen such that the degree of increase in the tension of the elastic belt 2 is kept small to prevent over-stretching of the elastic belt 2.

Figure 2:
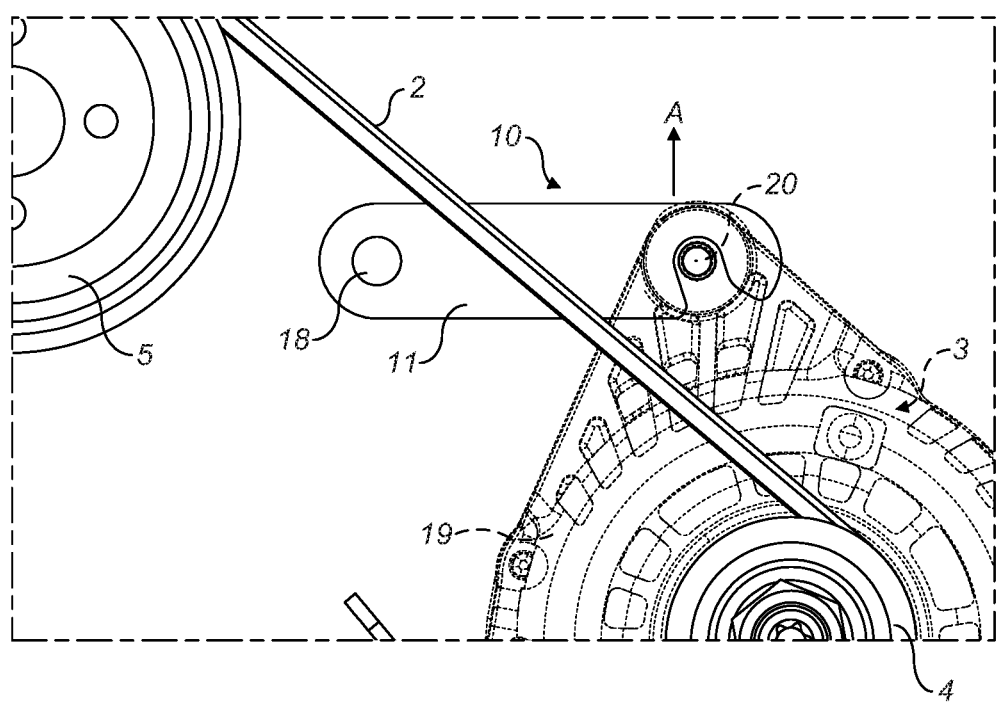
FIG. 2 shows an enlarged view of a portion of FIG. 1.

As the auxiliary unit 3 is rotated in the first sense the tensioning link 10 may be manually lifted in the direction A shown in FIG. 2 to assist in moving the detent 20 towards the open end 14. The position of the detent 20 as it reaches the open end 14 of the open-ended slot 13 is shown in FIG. 3 as position 20b, Once the detent 20 is disengaged from the open-ended slot 13 the tensioning link 10 may be rotated out of the way as shown in FIG. 3 to improve access for changing the elastic belt 2.

Figure 3:
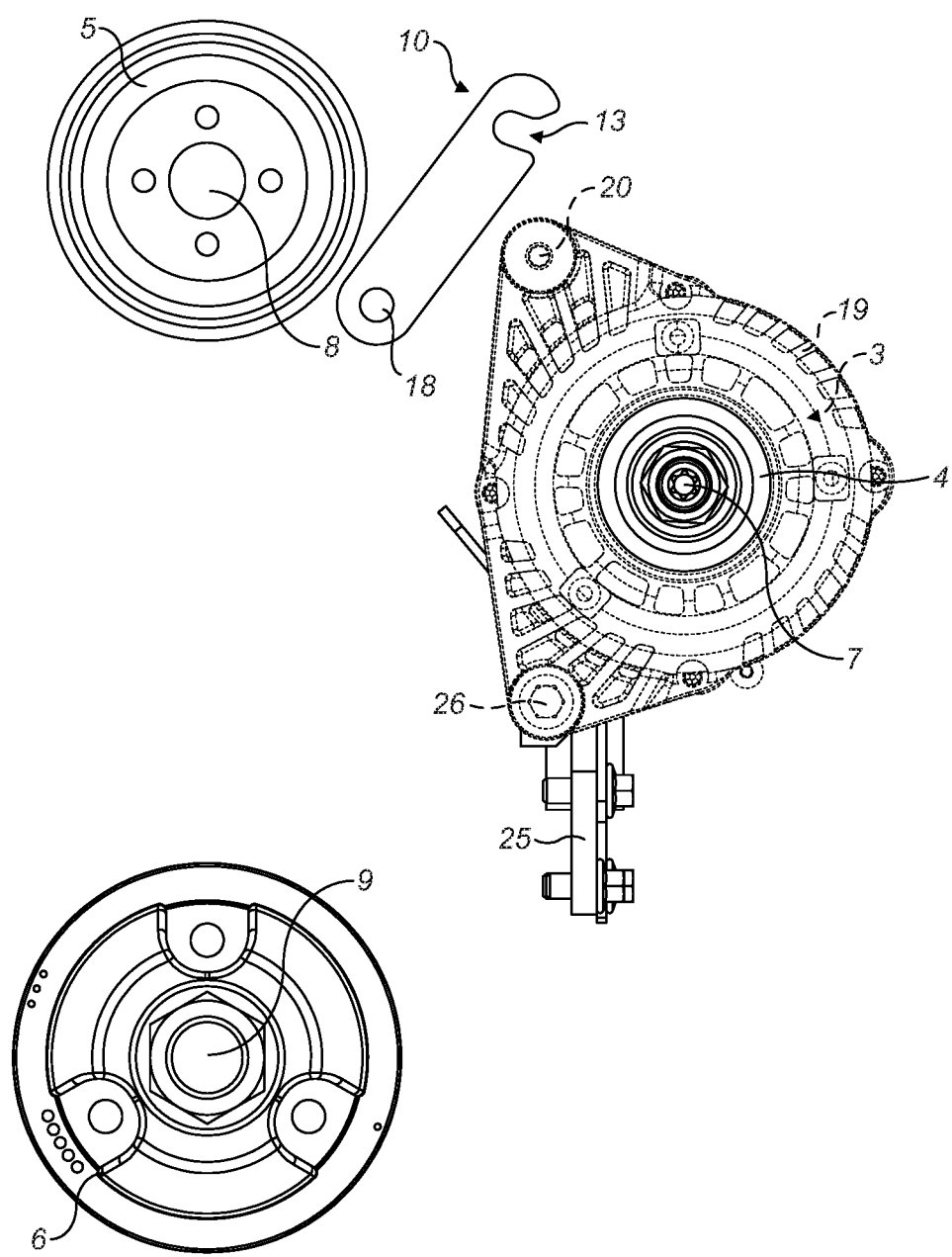
FIG. 3 shows the belt drive of FIG. 1 in a belt changing position with an elastic belt omitted.

In the belt changing position the auxiliary unit 3 has been rotated such that the first pulley 4 is now closer to the at least one additional pulley 5, 6 than in the operating position as shown in FIG. 3 such that a tension of the elastic belt 2 is less in the belt changing position than in the operating position. Thus, in the belt changing position the elastic belt 2 may more easily be mounted and dismounted from the pulleys 4, 5, 6. FIG. 3 shows the belt drive 1 with the elastic belt 2 removed.

To return the belt drive 1 to its operating position the above steps may be reversed. In particular, rotating the auxiliary unit 3 in the first sense (clockwise as viewed in FIG. 1) and rotating the tensioning link 10 allows the detent 20 to enter the open-ended slot 13 through the mouth formed by the open end 14. The detent 20 may then slide along the open-ended slot 13 towards and into contact with the closed end 15 under the biasing tension of the elastic belt 2 as the auxiliary unit 3 is released. During this engagement step the tensioning link 10 may have a tendency to drop under gravity to assist movement of the detent 20 towards the closed end 15. This movement may be assisted manually.

INDUSTRIAL APPLICABILITY

The present disclosure finds application in providing a tensioning link and a belt drive that may be used, for example, with internal combustion engines. In one example, the auxiliary unit may be an alternator.

The present disclosure may find particular application where the elastic belt is an elastic Multi-V-belt.

Advantageously, the belt drive of the present disclosure may produce a pre-defined tension in the elastic belt without requiring use of a fixative, for example a nut, that is applied between the tensioning link and the detent of the auxiliary unit. This may allow a simplified arrangement which is easier to install and operate. In particular, the movement of the auxiliary unit between its operating position and its belt changing position may be achieved without the use of any tools, i.e. in a tool-free operation.

Advantageously, the belt drive of the present disclosure may ensure that a pre-defined tension in the elastic belt is always obtained since the detent of the auxiliary unit will always be urged against the closed end of the open-ended slot when the auxiliary unit is in its operating position.

Advantageously, there may be no risk that the detent is fixed in an alternative location of the open-ended slot that is not the end stop. In other words, the design of the tensioning link may ensure that there is only one possible location for the detent when the auxiliary unit is in its operating position.

Advantageously, the angling of the open-ended slot may ensure that the tensioning link is 'self-locking' when the auxiliary unit is in its operating position without the need for any additional fixing. In particular, when the auxiliary unit is in its operating position the tension in the elastic belt always urges the detent against the closed end of the open-ended slot. However, optionally an additional fixing may be applied to the detent to provide an additional resistance against movement of the detent within the open-ended slot. For example, a nut may be applied to the detent in the example where the detent is a stud bolt.

Advantageously, the use of an open-ended slot to receive the slot may permit for easier engagement and disengagement and thus easier replacement of the elastic belt.

What is claimed is:

1. A belt drive comprising:
a first pulley;
at least one additional pulley;
an elastic belt that is engageable over the first pulley and the at least one additional pulley; and
an auxiliary unit connected to the first pulley;
the auxiliary unit comprising a detent;
the auxiliary unit being rotatable about a first pivot between an operating position and a belt changing position, wherein in the belt changing position, the first pulley is closer to the at least one additional pulley than in the operating position such that a tension of the elastic belt is less in the belt changing position than in the operating position;
the belt drive further comprising a tensioning link being rotatable about a second pivot;
the tensioning link comprising an open-ended slot for receiving the detent in a slidable manner;
the open-ended slot having an open end and a closed end and being configured such that the closed end is located closer to the second pivot than the open end;
in the operating position, the detent is locatable at the closed end of the open-ended slot and to obtain the belt changing position, the detent is movable along the open-ended slot towards, and preferably out of, the open end of the open-ended slot: wherein movement of the detent along the open-ended slot requires simultaneous rotation of the auxiliary unit about the first pivot.

2. The belt drive of claim 1, wherein the movement of the detent along the open-ended slot requires simultaneous rotation of the auxiliary unit about the first pivot so as to increase the tension in the elastic belt.

3. The belt drive of claim 1, wherein the open-ended slot is angled such that, in the operating position, a tension in the elastic belt urges the detent against the closed end of the open-ended slot such that the detent is retainable in the open-ended slot without requiring any additional securing means.

4. The belt drive of claim 1, wherein the open-ended slot is orientated at an angle of less than 90° to a radial line which passes from the second pivot through the detent when located at the closed end of the open-ended slot.

5. The belt drive of claim 1, wherein the open-ended slot comprises a first, preferably straight, edge that extends between the open end and the closed end, the first edge being the edge of the open-ended slot that is proximal to the second pivot;
wherein the first edge is orientated at an angle of less than 90° to a radial line which passes from the second pivot through the detent when located at the closed end of the open-ended slot.

6. The belt drive of claim 1, wherein the open-ended slot comprises at least a straight portion, preferably comprising straight parallel edges.

7. The belt drive of claim 1, wherein a distance between the second pivot and the closed end of the open-ended slot is configured to apply a predefined tension to the elastic belt in the operating position.

8. The belt drive of claim 1, wherein the tensioning link comprises an aperture for rotatably mounting the tensioning link to the second pivot; wherein the aperture is sized and shaped such that the tensioning link is constrained to have a fixed axis of rotation about the second pivot.

9. The belt drive of claim 1, wherein the auxiliary unit is an alternator.

10. The belt drive of claim 1, wherein the at least one additional pulley comprises a second pulley and a third pulley and wherein the elastic belt is an elastic Multi-V-belt.

11. A belt drive comprising:
a first pulley;
at least one additional pulley;
an elastic belt engageable over the first pulley and the at least one additional pulley;
an auxiliary unit configured for coupling to the first pulley and comprising a detent, the auxiliary unit being rotatable about a first pivot between an operating position and a belt changing position; and
a tensioning link rotatable about a second pivot, the tensioning link including an elongate body having an aperture for rotatably mounting the tensioning link to the second pivot and an open-ended slot for receiving the detent in a slidable manner;
the open-ended slot having an open end and a closed end and being configured such that the closed end is located closer to the second pivot than the open end.

12. The belt drive of claim 11, wherein the open-ended slot is orientated at an angle of less than 90° to a radial line which passes from the aperture through the detent when located at the closed end of the open-ended slot.

13. The belt drive of claim 11, wherein the open-ended slot comprises a first, preferably straight, edge that extends between the open end and the closed end, the first edge being the edge of the open-ended slot that is proximal to the aperture;
wherein the first edge is orientated at an angle of less than 90° to a radial line which passes from the aperture through the detent when located at the closed end of the open-ended slot.

14. The belt drive of claim 11, wherein the open-ended slot comprises at least a straight portion, preferably comprising straight parallel edges.

15. The belt drive of claim 11, wherein the aperture is sized and shaped such that the tensioning link, in use, is constrained to have a fixed axis of rotation about the second pivot.

\* \* \* \* \*